United States Patent
Nishida et al.

[11] Patent Number: 5,295,005
[45] Date of Patent: Mar. 15, 1994

[54] LIQUID CRYSTAL DISPLAY DEVICE WITH IMPROVED CONVERGENCE EFFICIENCY AND CONVERTING REFLECTOR OF THE SAME

[75] Inventors: Masami Nishida; Masataka Izawa; Kunimoto Tsuchiya, all of Tokyo, Japan

[73] Assignee: Pioneer Electronic Corporation, Tokyo, Japan

[21] Appl. No.: 771,000

[22] Filed: Oct. 1, 1991

[30] Foreign Application Priority Data

Dec. 19, 1990 [JP] Japan ............... 2-403601
Dec. 19, 1990 [JP] Japan ............... 2-403602

[51] Int. Cl.⁵ ............... G02F 1/13; G03B 21/14; G02B 5/08
[52] U.S. Cl. ............... 359/41; 359/49; 353/31
[58] Field of Search ........... 359/40, 867, 41, 869, 359/48, 49; 353/31, 33, 34, 37, 98; 362/296, 347, 350

[56] References Cited

U.S. PATENT DOCUMENTS

| | | | |
|---|---|---|---|
| 4,864,390 | 9/1989 | McKechnie et al. | 359/49 |
| 5,123,729 | 6/1992 | Kondo et al. | 359/49 |
| 5,142,387 | 8/1992 | Shikama et al. | 359/41 |
| 5,146,248 | 9/1992 | Duwaer et al. | 359/49 |
| 5,192,962 | 3/1993 | Nishida et al. | 359/49 |

*Primary Examiner*—William L. Sikes
*Assistant Examiner*—Tai V. Duong
*Attorney, Agent, or Firm*—Kane, Dalsimer, Sullivan, Kurucz, Levy, Eisele and Richard

[57] ABSTRACT

A liquid crystal display device comprises a converging reflector, a liquid crystal panel, a condenser lens and a projection lens, wherein a correlation between these optical parts and structure of sizes of the optical parts is considered. Accordingly, a convergence efficiency of the device as whole system can be improved. A converging reflector comprises a light source and a reflecting mirror reflecting a light from the light source, wherein a curved plane shape of the mirror is offset radially to the same length as a radius of a light emitting tube of the light source. Accordingly, a convergence efficiency of the converging reflector can be improved.

7 Claims, 7 Drawing Sheets

LIQUID CRYSTAL DISPLAY DEVICE WITH IMPROVED CONVERGENCE EFFICIENCY AND CONVERTING REFLECTOR OF THE SAME

BACKGROUND OF THE INVENTION

The present invention relates to a liquid crystal display device having a converging reflector to reflect a light from a light source to converge or condense and project the reflected light onto a predetermined plane of irradiation, and also relates to the converging reflector used for the liquid crystal display device and being capable of improving convergence efficiency.

A conventional converging reflector of one type is formed by a reflecting mirror of paraboloid of revolution wherein a light source is arranged at the focal point of the paraboloid of revolution to reflect a light from the light source to form a parallel light by the parabolic reflector.

A conventional liquid crystal display device of the type including the converging reflector of the kind described above is of a structure capable of separating a white light from the converging reflector into rays of three colors of red (R), green (G) and blue (B) by using dichroic mirrors. Respective rays of color lights of R, G and B strike on each of liquid crystal cells through condenser lenses to vary transmittance of the liquid crystal cells in response to respective image signals to thereby allow respective rays of incident color lights of R, G and B to be transmitted therethrough or intercepted thereby, thus projecting images corresponding thereto onto a screen through a projection lens.

Since the conventional converging reflector is constructed as described above, a light source which can be considered as a point light source must be arranged at the focal point of the reflecting mirror in order to permit a light to be reflected on an ideal circular plane of projection or an ideal point.

However, the point light source cannot get high luminance or brightness. Hence, for example, a metal halide lamp is used as a lamp having a high luminance and a long life span. A light is emitted between two electrodes in the metal halide lamp. For this reason, such a light source cannot be considered as the point light source and the size of that light source would not be negligible, thus disadvantageously failing to allow a light to be reflected to an ideal circular shape or an ideal point on a plane of projection. Hence, the converging reflector is not capable of improving convergence efficiency.

The convergence efficiency of the liquid crystal display device using the converging reflector is an illuminance of rays which is reflected on the converging reflector and then pass through the condenser lens, liquid crystal cell and projection lens.

In the case of the conventional liquid crystal display device, although an incident light from the converging reflector is projected through the dichroic mirrors, the condenser lenses, the liquid crystal cells, and the projection lens, only each of the convergence efficiencies of the converging reflector and liquid crystal cell is taken into consideration, but the correlation of the entirety of the liquid crystal display device is not taken into consideration by any means. Thus, the convergence efficiency of the entirety of the liquid crystal display device is unable to be improved.

SUMMARY OF THE INVENTION

The present invention has been made in order to solve the abovementioned problems, and its object is to provide a liquid crystal display device capable of improving convergence efficiency of the entirety of the device, and a converging reflector thereof capable of improving convergence efficiency of the same.

A liquid crystal display device according to this invention comprises: a converging reflector provided with a linear light source positioned at a central axis of the converging reflector, and a plane of reflection formed by a reflecting mirror of paraboloid of revolution; a liquid crystal panel for selectively passing a light reflected from the converging reflector; a condenser lens arranged between the converging reflector and the liquid crystal panel, and transmitting a ray of the light from the converging reflector to the liquid crystal panel; and a projection lens projecting the ray of the light from the liquid crystal panel on an irradiation plane, wherein a curvature of the paraboloid of the converging reflector is about $0.015 \pm 0.0025$ mm$^{-1}$, a length of the linear light source is about 5 to 7 mm, an aperture of the converging reflector is about $100 \pm 20$ mm, and an effective display size of the liquid crystal panel is about 2.8 to 3.3 inches.

Further, a converging reflector according to this invention comprises: a light source positioned at a central axis of the converging reflector; and a reflecting mirror reflecting a light from the light source and projecting the reflected light to an irradiation plane; wherein the light source comprises a light emitting tube having a predetermined radius and a curved plane shape of the reflecting mirror is offset radially to the same length as the radius of the light emitting tube according to the central axis.

BRIEF DESCRIPTION OF THE DRAWINGS

In the accompanying drawings:

FIG. 1 is a diagram showing the configuration of a liquid crystal display device of a first embodiment of this invention;

FIG. 2 is a diagram of a second embodiment for showing a relationship of an F-number, a length from converging reflector front end to liquid crystal panel, and a focal length in telecentric system of the first embodiment of this invention;

FIG. 3 is a schematic diagram showing a configuration of conventional converging reflector;

FIGS. 4 to 12 describe a third to a fifth embodiments of this invention;

FIGS. 4 and 5 are schematic diagrams showing configuration of converging reflectors of a third and a fourth embodiments of this invention, respectively;

FIG. 6 is a diagram showing the entirety of a configuration in the case where the converging reflector shown in FIG. 5 is applied to a liquid crystal display device;

FIG. 7 is a schematic diagram showing configuration of a converging reflector of the fifth embodiment of this invention;

FIG. 8 is an explanatory view showing a detail of a light source shown in FIG. 7;

FIG. 9 is an explanatory view showing a detail of an other light source of the fifth embodiment; and FIGS. 10 and 11 are schematic diagrams showing configuration of conventional converging reflectors, respectively.

DESCRIPTION OF THE PREFERRED EMBODIMENTS

As conductive to a full understanding of the nature and utility of this invention, a brief consideration of a typical conventional converging reflector will be first presented below with reference to FIG. 3.

Figure 3:
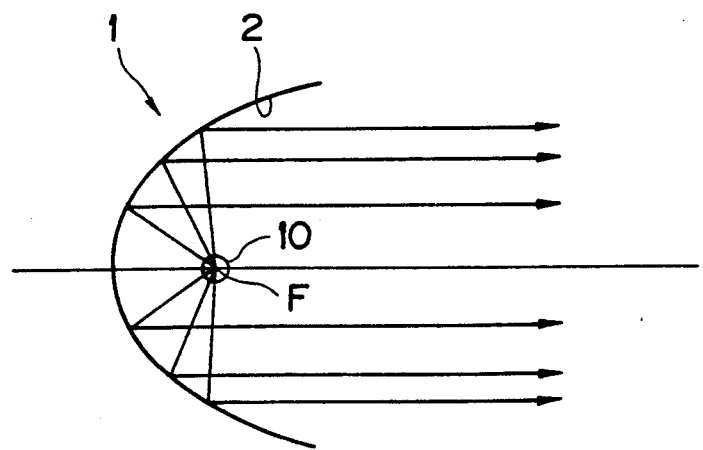

As shown in FIG. 3, a conventional converging reflector 1 is formed by a reflecting mirror 2 of paraboloid of revolution. A light source 10 is arranged at a focal point F of the paraboloid of revolution. Thus, light rays from the light source 10 is reflected as parallel light rays by the reflecting mirror 2 of paraboloid of revolution. The parallel light rays can be projected as an ideal circular phase on a plane of projection.

Since conventional converging reflector 1 is constructed as described above, the light source 10 which can be considered as a point light source must be arranged at the focal point F of the reflecting mirror 2 in order to permit the light to be reflected on an ideal circular plane of projection. However, the point light source 10 cannot get high luminance or brightness. Hence, for example, a metal halide lamp is used as a light source having a high luminance and long life span. A light is emitted between two electrodes in the metal halide lamp. For this reason, such the light source cannot be considered as the point light source, and disadvantageously failing to allow a light to be reflected to an ideal circular shape or an ideal point on a plane of projection.

This invention is of a structure improving a convergence efficiency of a liquid crystal display device and a converging reflector used in the liquid crystal display device.

A first embodiment of this invention will now be explained with reference to FIG. 1 which shows the outline of a configuration of a liquid crystal display device of this embodiment.

In this figure, a converging reflector 20 comprises a light source 22 arranged on a central axis 21, and a reflecting mirror 24 having a plane of reflection 23 formed by paraboloid of revolution which has the central axis 21 on a center of the plane 23. An aperture of the converging reflector 20 is 100±20 mm.

The light source 22 formed by a metal halide lamp includes a pair of electrodes provided at their respective positions with a space of 5 to 7 mm therebetween, so that the light source 22 is in the form of a long shape. One end point 22a of the light source 22 is arranged at the focal point of the plane of reflection 23, and other end point 22b of the light source 22 is arranged toward a liquid crystal cell from the focal point. A curvature a of the plane of reflection 23 is 0.015±0.0025 mm$^{-1}$. A shape of the plane of reflection 23 can be expressed as follows.

$$z = ay^2 - (\tfrac{1}{4}a)$$

where z is a coordinate axis of a direction of the central axis 21, y is a coordinate axis of a direction normal to the coordinate axis z.

A white light emitted by the light source 22 is reflected by the reflecting mirror 24. The reflected white light preferably is parallel rays, and is separated into rays of light of three colors of red (R), green (G) and blue (B) by using dichroic mirrors 50 and 51. Light rays of R, G and B are projected to liquid crystal cells (or panels) 60R, 60G and 60B through condenser lenses 81R, 81G and 81B, respectively. Each of condenser lenses 81R, 81G and 81B is arranged between the converging reflector 20 and each of liquid crystal cells 60R, 60G and 60B, and transmits light rays of R, G and B from the converging reflector 20 to each of liquid crystal cells 60R, 60G and 60B, respectively.

These liquid crystal cells 60R, 60G and 60B are used for selecting rays of color lights R, G and B and for projecting them. Namely, the respective rays of color lights R, G and B vary transmittance of the liquid crystal cells 60R, 60G and 60B in response to respective image signals to allow respective rays of incident lights of R, G and B to be transmitted therethrough or intercepted thereby. Each of liquid crystal cells 60R, 60G and 60B has an image plane having effective display size of about 2.8 to 3.3 inches.

Each of rays of color lights R, G and B selected and projected by the each of liquid crystal cells goes through a projection lens 80, and then is projected on a screen 90 as an irradiation plane, hence, color image being formed on the screen 90.

Numerals 60 and 61 indicate flat reflecting mirrors so as to reflect a reflected ray from the dichroic mirror 50 and to reflect a transmitted ray from the liquid crystal cell 60R, respectively. Numeral 70 indicates a dichroic mirror for transmitting a ray from the liquid crystal cell 60B, and for reflecting a ray from the liquid crystal cell 60G. Numeral 71 indicates a dichroic mirror for transmitting a ray from the dichroic mirror 70, and for reflecting a ray from the flat reflecting mirror 61, further for projecting the rays to projection lens 80.

As described above, a convergence efficiency of the liquid crystal display device as whole system can be improved over 20% in comparison with a convergence efficiency of the conventional liquid crystal display device by constructing the sizes of the optical parts in consideration of the correlations between these optical parts.

In the above embodiment, the light source 22 is composed of the metal halide lamp, however, other lamp can be used as the light source 22.

Figure 2:
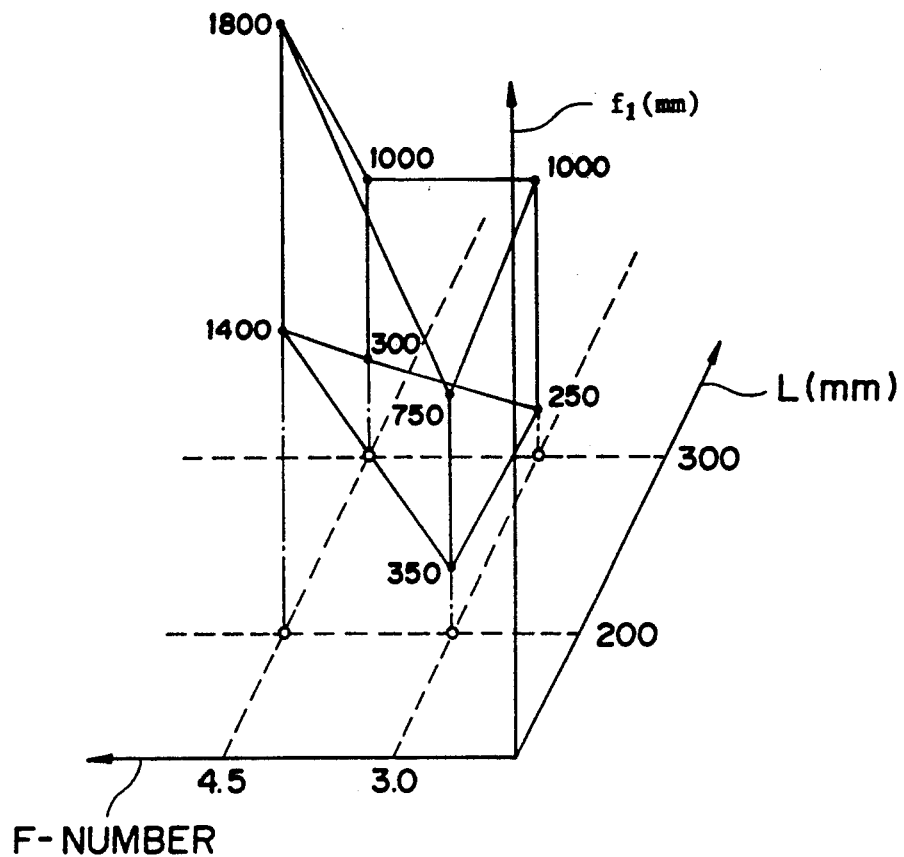

FIG. 2 shows a second embodiment of this invention, and is a diagram showing relationships between F-number of each of the condenser lenses 81R, 81G and 81B, a length L mm from a front end (or aperture end) 20a of the converging reflector 20 to the crystal panels 60R, 60G and 60B, and focal length f1 mm of the condenser lenses 81R, 81G and 81B, in a telecentric system of the first embodiment.

Figure 1:
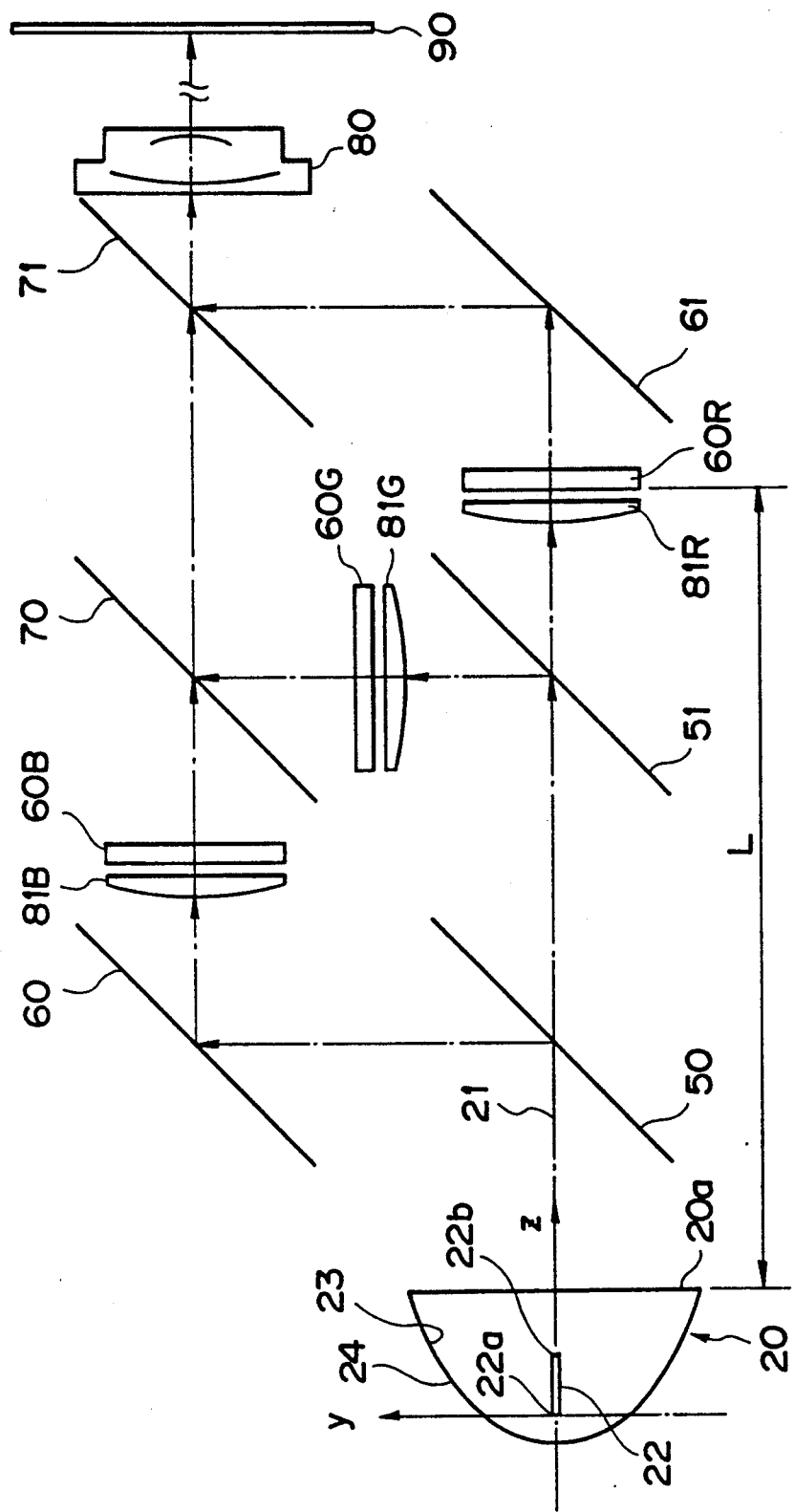
FIGS. 1 to 3 describe a first and a second embodiments of this invention.

A liquid crystal display device of this second embodiment has substantially the same structure as that shown in FIG. 1. The length L from the front end 20a to the crystal panel 60R is shown, as one example.

The following mutual relationship between the F-number, the length L and the focal length f1 is desirable.

Three-dimensional coordinate system of the F-number, the length L and the focal length f1 is shown in FIG. 2. In the area where the F-number of the coordinate plane of the F-number-length L is 3.0 to 4.5, and the length L in that plane is 200 to 300 mm, when the F-number is 3.0 and the length L is 200 mm, the focal length f1 is set to a range of 350 to 750 mm, when the F-number is 3.0 and the length L is 300 mm, the focal length f1 is set to a range of 250 to 1000 mm, when the F-number is 4.5 and the length L is 200 mm, the focal length f1 is set to a range of 1400 to 1800 mm, when the F-number is 4.5 and the length L is 300 mm, the focal length f1 is set to a range of 300 to 1000 mm.

When setting is made in connection with the above-mentioned respective F-number, length L and focal length f1 in this way, a high convergence efficiency and a uniform illuminance distribution are provided over the entirety of the device with respect to the diagonal direction of the liquid crystal panels 60R, 60G and 60B. The above relationship can be similarly determined with respect to any directions of the liquid crystal panels 60R, 60G and 60B.

In FIGS. 1 and 2, the projection lens 80 is arranged in the telecentric system where an eye position is infinite, in addition, relationship between an actual projection lens 80 and each of the condenser lenses 81R, 81G and 81B in a non-telecentric system can be expressed as follows.

$$(1/f) = (1/f1) + (1/la)$$

where f is a focal length of each of the actually used condenser lenses 81R, 81G and 81B, and la is a position of the eye position of the actually used projection lens 80.

In the above-mentioned equation, in the case of the telecentric system, the length la becomes to $\infty$ and the focal length f is equal to f1.

As stated above, in the entirety of the optical system including the converging reflector 20, the liquid crystal panels 60R, 60G and 60B, the condenser lenses 81R, 81G and 81B and the projection lens 80, the relationships between the above optical parts as shown in FIG. 2 can improve the light utilization efficiency of the entirety of the device.

As described above, according to the first and second embodiments, the convergence efficiency is considered over the entirety of the optical system, so that the convergence efficiency of the entirety of the liquid crystal display device can be improved.

Third to fifth embodiments according to this invention will be explained hereunder with reference to FIGS. 4 to 12.

Figure 10:
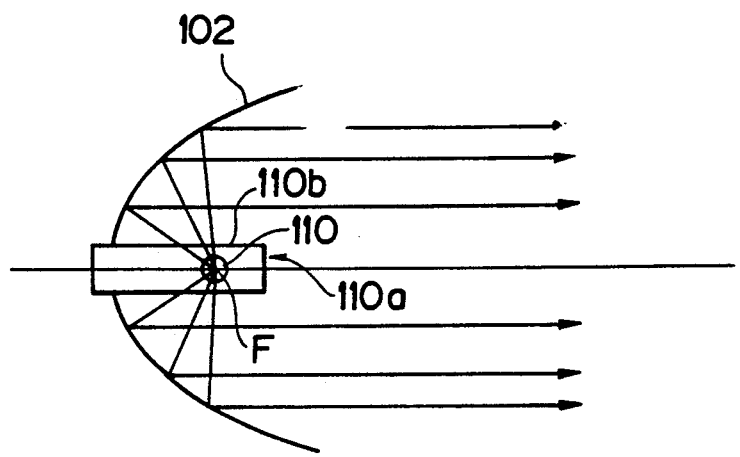

A conventional converging reflector shown in FIG. 10 is formed by a reflecting mirror 102 of paraboloid of revolution. A light source 110 is arranged at a focal point F of the paraboloid of revolution. Thus, a light from the light source 110 reflected as parallel light rays by the reflecting mirror 102 of the paraboloid of revolution.

Figure 11:
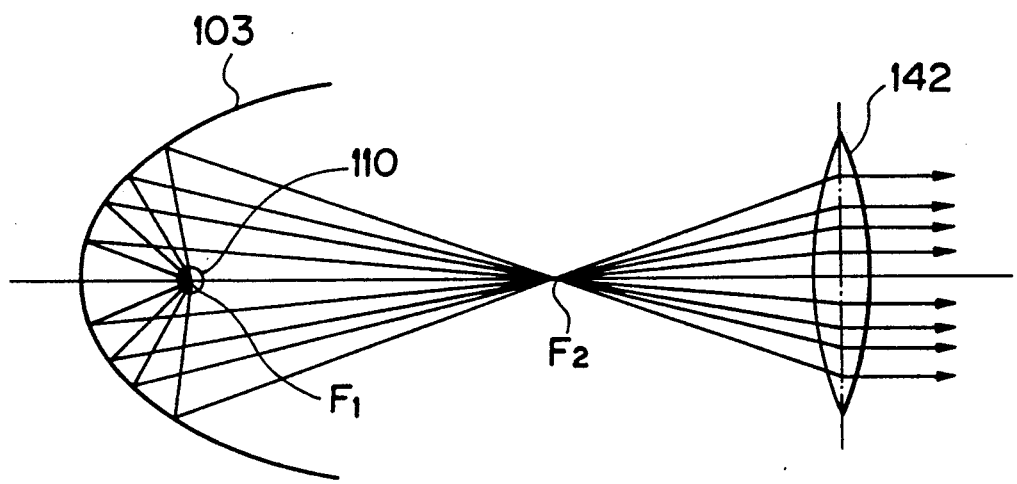

On the other hand, in FIG. 11, another conventional converging reflector is formed by a reflecting mirror 103 of ellipsoid of revolution. A light source 110 is arranged at a first focal point $F_1$ of ellipsoid of revolution. Light rays from the light source 110 are reflected by the reflecting mirror 103, and are converged to a second focal point $F_2$. The reflected light rays thus obtained are then changed to parallel light rays by a condenser lens 142 whose focal point is coincident with the second focal point $F_2$ of the reflecting mirror 103 and then outgo therefrom.

The respective conventional converging reflectors are used to the liquid crystal display device such as shown in FIG. 1.

In the case of the conventional converging reflectors, by arranging the point light source 110 at the focal point F (or $F_1$) of each reflecting mirror 102 (or 103), it is possible to emit rays of the parallel light or rays of convergent light to reflect and project those rays of light on an ideal circular shape or an ideal point on a plane of projection.

For achieving this advantage, the point light source 110 must be arranged at the focal point F (or $F_1$) of the reflecting mirror 102 (or 103). However, an attempt is made to realize a light source of high luminance or brightness, the light source itself would be large. For example, a frosted metal halide lamp is used to the light source because of its high luminance.

In FIG. 10, a frosted metal halide lamp 110a is used. According to the lamp 110a, the rays of light are emitted between two electrodes, and a white light outgoes from a surface 110b of a tube of the lamp 110a. Therefore, the lamp 110a is not deemed to be a point light source because of a radius distance of the tube. Hence, the rays cannot be converged into a point on the plane of projection, and the convergence efficiency is not improved. Accordingly, this invention is offered.

Figure 4:
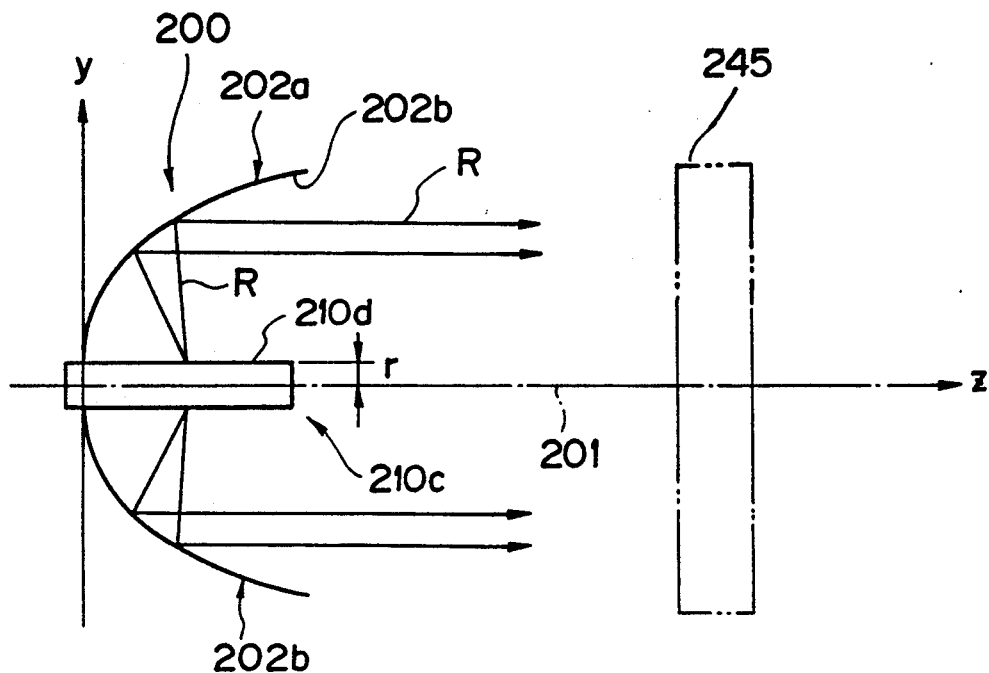

The third to fifth embodiments of this invention will be explained. For simplicity, only the reflector and light emitting tube portions of the display device, which replace the corresponding components of the liquid crystal display device of FIG. 1, are described and discussed. FIG. 4 shows a converging reflector 200 of the third embodiment improving the structure shown in FIG. 10. In FIG. 4, a light emitting tube 210c as a light source has a predetermined or arbitrary radius r, and is arranged at a central axis 201 of a reflecting mirror 202a. The reflecting mirror 202a has a mirror plane 202b of paraboloid of revolution.

A curved plane shape of the mirror plane 202b is offset radially to the same length as the radius r of the light emitting tube 210c according to the central axis 201. In this embodiment, the length of the offset of the mirror plane 202b is satisfied with the following equation, and relationship between arbitrary radius r and z-coordinate is decided to the equation.

$$z = a(y-r)^2 - (\tfrac{1}{4}a)$$

where a is a curvature of paraboloid of revolution of the reflecting mirror 202a, y is a length of the curved plane shape of the mirror plane 202b from the central axis 201, and z is a coordinate axis having the same direction as the central axis 201.

According to the converging reflector 200 having the above construction, rays of light R emitted from a surface 210d of the light emitting tube 210c are reflected by the reflecting mirror 202a, and then are projected to a plane of projection 245 as parallel light rays, preferably.

Accordingly, this converging reflector 200 can get smaller loss of the ray of the light R than one of the conventional converging reflector shown in FIG. 10. Hence, a convergence efficiency of a system after the plane of projection 245 can be improved to 25 to 30%, for example, rather than the conventional converging reflector.

Figure 5:
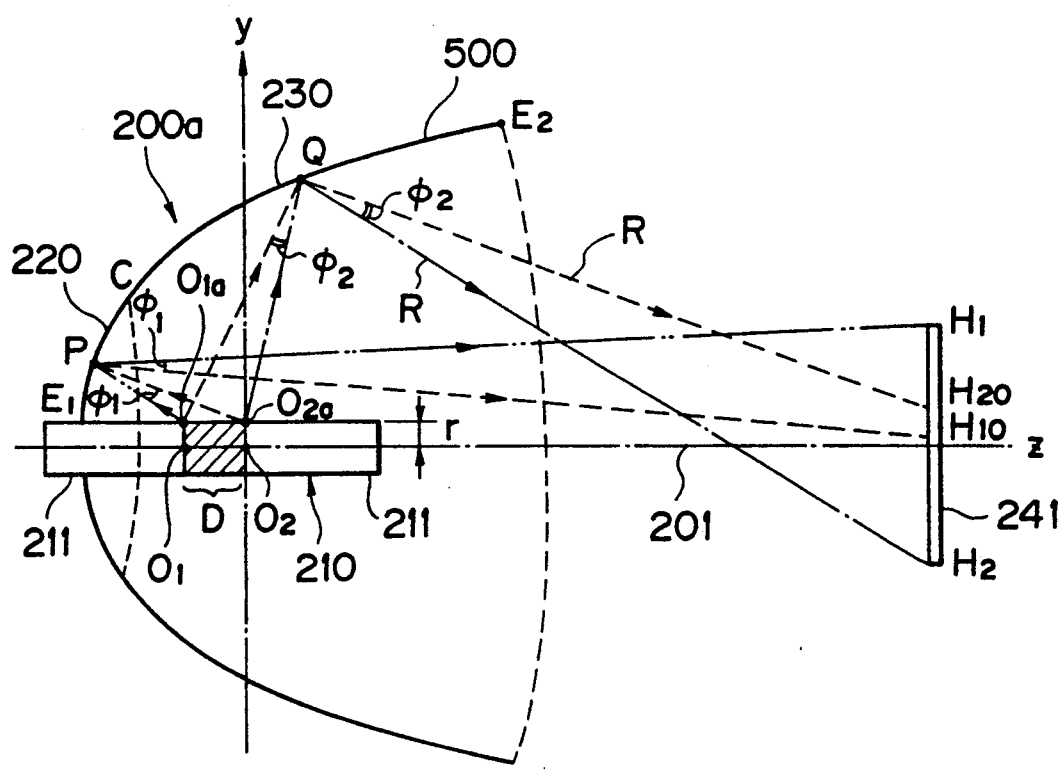

The fourth embodiment of this invention will now be explained hereunder with reference to FIGS. 5 and 6. FIG. 5 shows an outline of the configuration of a converging reflector 200a of this embodiment.

In this figure, the converging reflector 200a comprises a metal halide lamp 210 (as a light source) including two electrodes $O_1$ and $O_2$ provided at their respective positions with a space of 5 to 11 mm therebetween, and a reflecting mirror 500 including a first elliptic reflecting section 220 and a second elliptic reflecting section 230. The first elliptic reflecting section 220 comprises a curved surface C-E$_1$ of ellipsoid of revolution having one focal point being coincident with one end portion H$_1$ of an irradiation plane 241 onto which a light R from the reflecting mirror 500 is projected, and other focal point being coincident with one longitudinal end O$_{1a}$ of a peripheral portion of the electrode O$_1$. The second elliptic reflecting section 230 is connected, at a contact line C, to an outer peripheral end portion of the first elliptic reflecting section 220. The second elliptic reflecting section 230 comprises a curved surface C-E$_2$ of ellipsoid of revolution having one focal point being coincident with other end portion H$_2$ of the irradiation plane 241, and other focal point being coincident with other longitudinal end O$_{2a}$ of the peripheral portion of the electrode O$_2$.

More particularly, the metal halide lamp 210 is of a structure including two valves 211 each serving as an outer tube provided at both end portions of the lamp 210, and two electrodes O$_1$ and O$_2$ each serving as a light emitting section provided between the two valves 211 at the both end portions. A cylindrical portion D of the two electrodes O$_1$ and O$_2$ is frosted between the longitudinal ends O$_{1a}$ and O$_{2a}$, and the ray of the light R is emitted from the cylindrical portion D. A curved plane shape of the reflecting mirror 500 is formed for offset from a central line 201 with approximately the same length as a radius r of the lamp 210.

For example, the ray emitted from the longitudinal end O$_{1a}$ of the lamp 210 are reflected by the first elliptic reflecting section 220 of the reflecting mirror 500 and then converged into the end portion H$_1$ of the irradiation plane 241. The rays emitted from the longitudinal end O$_{2a}$ of the lamp 210 are reflected by the second elliptic reflecting section 230 of the reflecting mirror 500 and then converged into other end portion H$_2$ of the irradiation plane 241. Further, the rays emitted from a portion between two longitudinal ends O$_{1a}$ and O$_{2a}$ are converged into a portion between the two end portions H$_1$ and H$_2$, respectively.

The operation of the converging reflector 200a of this embodiment will now be described with reference to FIG. 6 in connection with the case where it is applied to a liquid crystal display device.

Respective rays of light R emitted from the electrodes O$_1$ and O$_2$ of the metal halide lamp 210 are projected from the cylindrical portion D between two longitudinal ends O$_{1a}$ and O$_{2a}$ and then enter an arbitrary point P on the curved surface C-E$_1$ of ellipsoid of revolution of the first elliptic reflecting section 220 at an angle $\phi_1$ between the respective rays of light. Thereafter, the rays are reflected from the arbitrary point P at the same angle $\phi_1$ between the respective rays of the reflected light and then enter a section located in a region from the portion H$_1$ to a portion H$_{10}$ on the irradiation plane 241.

The first elliptic reflecting section 220 takes thereinto the light from the light source 210 at the angle $\phi_1$ between the respective rays of light and reflects them from the arbitrary point P at the small emission angle $\phi_1$ and enters the irradiation plane 241 without being intercepted or screened by the valves 211 of the metal halide lamp 210.

Further, respective rays of light R emitted from the electrodes O$_1$ and O$_2$ of the metal halide lamp 210 are projected from the cylindrical portion D between two longitudinal ends O$_{1a}$ and O$_{2a}$ and then enter an arbitrary point Q on the curved surface C-E$_2$ of ellipsoid of revolution of the second elliptic reflecting section 230 at an angle $\phi_2$ between the respective rays of light. Thereafter, the rays are reflected from the arbitrary point Q at he same angle $\phi_2$ between the respective rays of the reflected light and then enter a section located in a region from the portion H$_2$ to a portion H$_{20}$ on the irradiation plane 241.

That is, the second elliptic reflecting section 230 takes thereinto the light from the light source 210 at the angle $\phi_2$ between the respective rays of light and reflects them from the arbitrary point Q at the small emission angle $\phi_2$ to enter the irradiation plane 241 without being intercepted or screened by the valves 211 of the metal halide lamp 210.

According to combination of the first and second elliptic reflecting sections 220 and 230 including curved surfaces C-E$_1$ and C-E$_2$ of ellipsoid of revolution having different focal points, respectively, the rays of light can be converged onto the irradiation plane 241 with high convergence efficiency.

Figure 6:
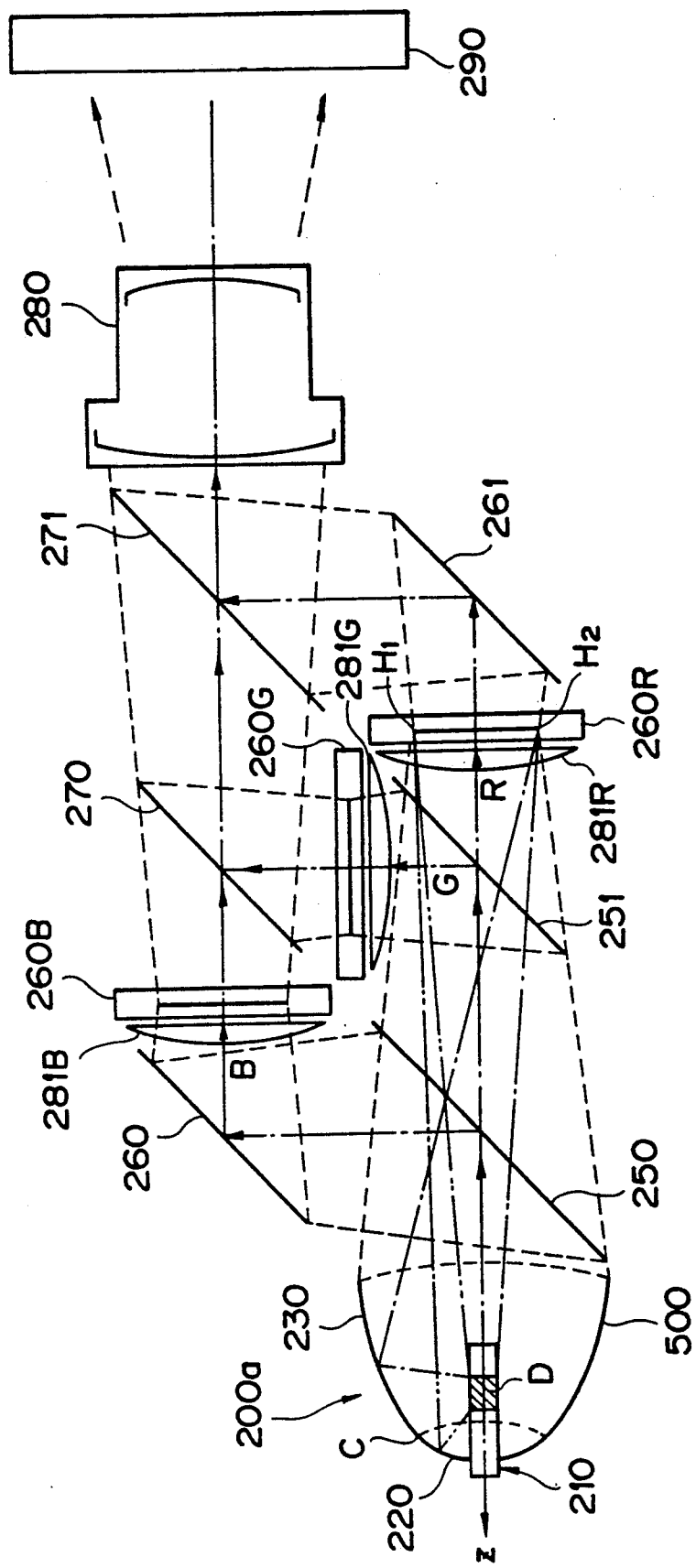

FIG. 6 shows an example of an application of the abovementioned converging system to a liquid crystal projection television.

In this figure, a light from a white light source 210 is separated into rays of light of three colors of R, G and B by using two dichroic mirrors 250 and 251 to form images by using liquid crystal cells 260R, 260G and 260B of which transmission factor of the rays vary in response to image signals of colors of R, G and B, respectively. These images thus formed are synthesized by using two dichroic mirrors 270 and 271. The light thus synthesized is projected onto a screen 290 by means of a signal projection lens 280. The numerals 260 and 261 are reflecting mirrors for reflecting the rays of light.

Here, when there is employed an arrangement such that the respective liquid crystal cells 260R, 260G and 260B are positioned so as to serve as the irradiation plane 241 shown in FIG. 5, light can be efficiently converged.

Further, when the three condenser lenses 281R, 281G and 281B, each having a focal point at the incident position of the projection lens 280, are arranged on the light source side of the liquid crystal cells 260R, 260G and 260B, respectively, the efficiency of light utilization is further improved.

In this embodiment, there is employed an arrangement such that optical distances from the light source 210 to the cell planes of the liquid crystal cells 260R, 260G and 260B of R, G and B are equal to each other.

Figure 7:
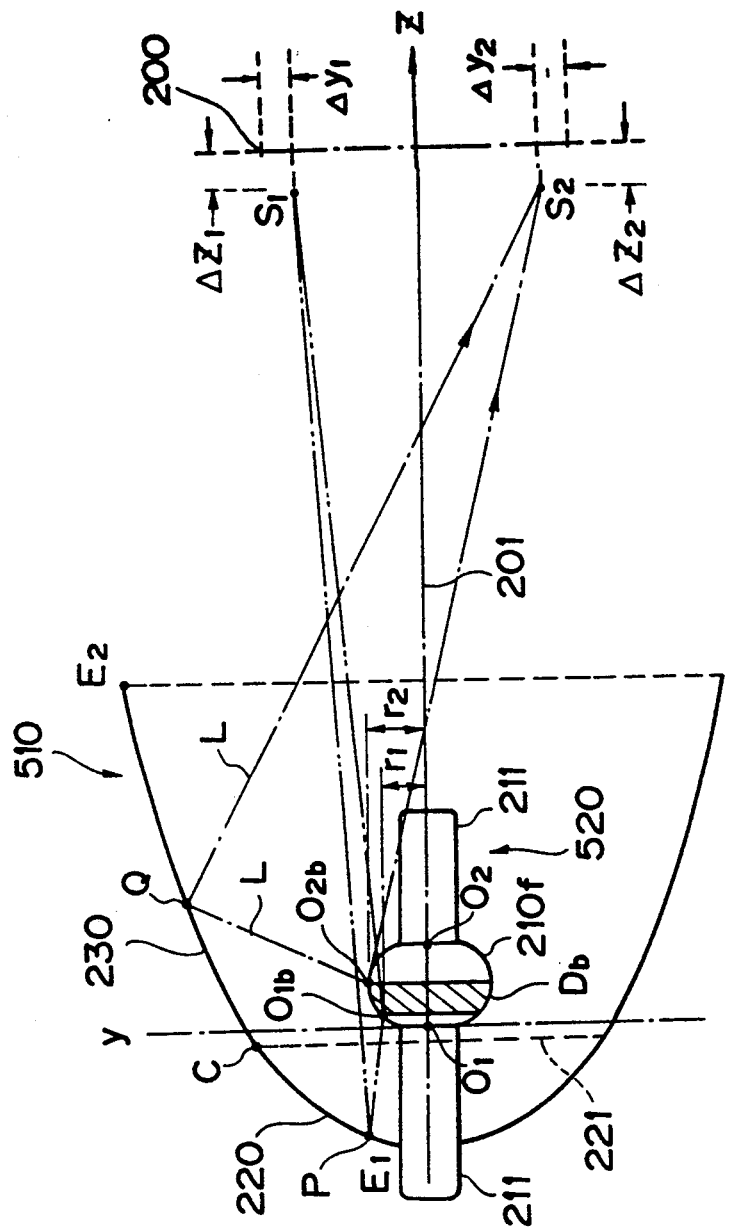
Figure 8:
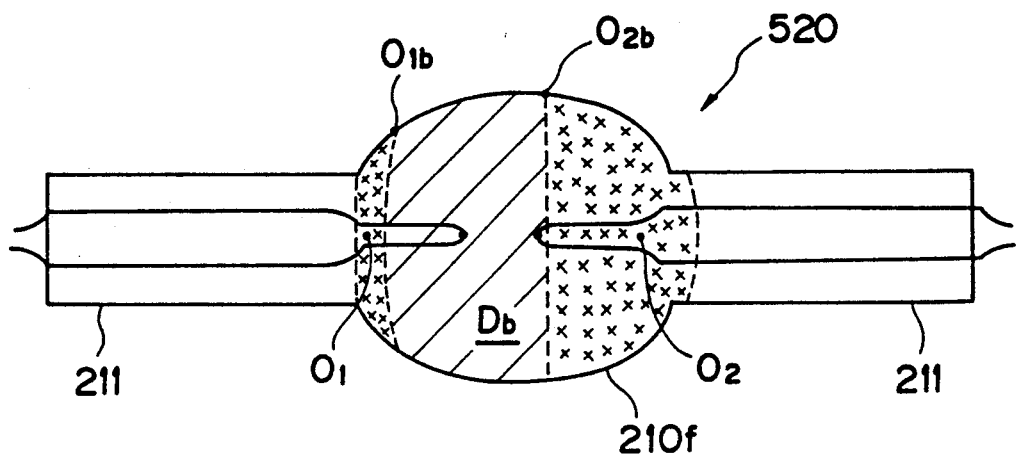

FIGS. 7 and 8 show a fifth embodiment of this invention. In FIG. 7, a light emitting tube (light source 520) of a converging reflector 510 comprises two valves 211 provided at both end portions of the light source 520, and a frosted metal halide lamp 210f provided between the two valves 211 at the both end portions and having two electrodes O$_1$ and O$_2$. The metal halide lamp 210f has a deformed spherical tube covered at its front and rear portions with screening films, and a frosted zone D$_b$ is formed between the screening zones and, light source ends O$_{1b}$ and O$_{2b}$ of the frosted zone D$_b$ have radiuses r$_1$ and r$_2$, respectively. The first elliptic reflecting section 220 of the converging reflector 510 is formed for offset from a central line 201 with approximately same length as the radius r$_1$ of the frosted zone D$_b$, and comprises a curved surface C-E$_1$ of ellipsoid of revolution. The second elliptic reflecting section 230 of the converging reflector 510 is formed for offset from the central line 201 with approximately the same length as the radius $r_2$ of the frosted zone $D_b$ and comprises a curved surface C-$E_2$ of ellipsoid of revolution.

The contact line C on a connection line 221 where the second section 230 is connected to the outer peripheral end portion of the first section 220 is positioned within a range of y=±30±5 mm and z=0±5 mm in the y−z dimensional coordinate system in which z - coordinate axis in correspondence with the central line 201 of a light projected from the converging reflector 510 onto a liquid crystal panel 200 is perpendicular to the y - coordinate axis at the position of the electrode $O_1$ on the z - coordinate axis.

Further, there is employed an arrangement such that other focal points $S_1$ and $S_2$ of the first and second reflection surfaces 220 and 230 having focal points coincident with light source ends $O_{1b}$ and $O_{2b}$, respectively, are positioned in a manner that they are spaced by distances $\Delta z_1$ and $\Delta z_2$ from the plane of convergent projection of the liquid crystal panel 200 to the side of converging reflector 510 and by distances $\Delta y_1$ and $\Delta y_2$ from the end portion of the liquid crystal panel 200 to the inside (z-axis side), respectively. The distances $\Delta z_1$ and $\Delta z_2$ are set within 50 mm, respectively, and the distances $\Delta y_1$ and $\Delta y_4$ are set within 2 mm respectively.

As described above, since the liquid crystal display device is constructed in consideration of mutual relationships between the converging reflector 510 and the liquid crystal panel 200, the convergence efficiency of the liquid crystal display device can be improved by 25 to 30% or more in comparison with that of the above conventional device.

Figure 9:
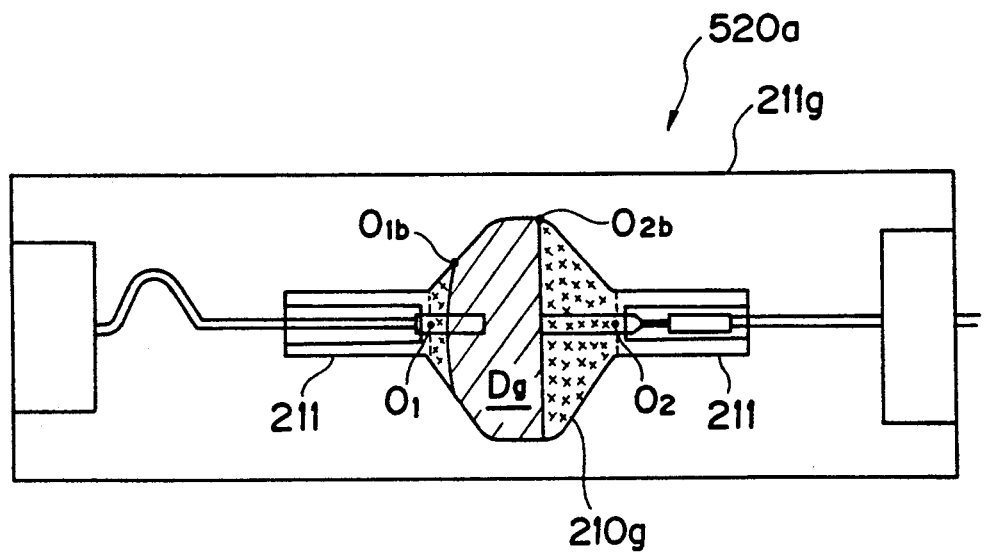

FIG. 9 shows other light source (light emitting tube) 520a of the converging reflector 510 comprises a frosted metal halide lamp 210g having a frosted zone $D_g$ and a transparent tube 211g accommodating the lamp 210g therein. According to the light source 520a, the lamp 210g can be protected by the tube 211g, and an aged deterioration of the lamp 210 can be improved.

The light sources of the above embodiments are metal halide lamps, however, when light emitting tube may have predetermined radius, it can be used for the device of this invention if it has other construction.

As described above, this invention has an arrangement such that the reflecting mirror is formed to be offset by predetermined distance from the central line when the light source is cylindrical and a surface of the cylindrical light source is a starting position of a projected ray. Consequently, the starting position of the projected ray on the cylindrical surface is coincident with a focal point of the reflecting mirror, and the ray projected from the focal point is reflected by the reflecting mirror and then converged onto an irradiation plane with an improved convergence efficiency.

What is claimed is:

1. A liquid crystal display device comprising:
   a converging reflector provided with a linear light source positioned at a central axis of the converging reflector and a plane of reflection formed by a reflecting mirror of paraboloid of revolution;
   a liquid crystal panel for selectively passing a light reflected from the converging reflector;
   a condenser lens arranged between the converging reflector and the liquid crystal panel for transmitting a ray of the light from the converging reflector to the liquid crystal panel; and
   a projection lens for projecting the ray of the light from the liquid crystal panel on an irradiation plane,
   wherein a curvature of the paraboloid of the converging reflector is about 0.015±0.0025 mm$^{-1}$, a length of the linear light source is about 5 to 7 mm, an aperture of the converging reflector is about 100±20 mm, and an effective display size of the liquid crystal panel is about 2.8 to 3.3 inches.

2. A liquid crystal display device according to claim 1, wherein a first end point of the light source is arranged at a focal point of a plane of reflection and a second end point of the light source is arranged toward the liquid crystal panel from the focal point.

3. A liquid crystal display device according to claim 1, wherein a white light from the light source is separated into rays of light of three colors of red, green and blue by using dichroic mirrors positioned between the light source and the liquid crystal panel.

4. A liquid crystal display device according to claim 1, wherein the light source is comprised of a metal halide lamp.

5. A liquid crystal display device according to claim 1, wherein in a region where an F-number in an F-number-length coordinate plane indicated by an F-number of the projection lens and a length from an end of the aperture of the converging reflector to the liquid crystal panel is 3.0 to 4.5 and the length in the F-number-length coordinate is 200 to 300 mm, a coordinate axis perpendicular to the F-number-length coordinate plane is set as a focal length of the condenser lens, wherein, in the region, when the F-number is 3.0 and the length is 200 mm, the focal length is set in a range of 350 to 750 mm, when the F-number is 3.0 and the length is 300 mm, the focal length is set in a range of 250 to 1000 mm, when the F-number is 4.5 and the length is 200 mm, the focal length is set in a range of 1400 to 1800 mm, and when the F-number is 4.5 and the length is 300 mm, the focal length is set in a range of 300 to 1000 mm.

6. A liquid crystal display device according to claim 1, wherein the light source of the converging reflector comprises a light emitting tube having a predetermined radius and a curved plane shape of the reflecting mirror of the converging reflector is offset radially to the same length as the radius of the light emitting tube according to the central axis.

7. A liquid crystal display device according to claim 6, wherein a length of an offset of the mirror plane is satisfied with a following equation and relationship between the radius and z-coordinate is decided to the equation;

$$z = a(y-r)^2 - (\tfrac{1}{4}a)$$

where a is a curvature of paraboloid of revolution of the reflecting mirror, y is a length of the curved plane shape of the mirror plane from the central axis, and z is a coordinate axis having the same direction as the central axis.

* * * * *